United States Patent
Flaig

(10) Patent No.: US 9,797,426 B2
(45) Date of Patent: Oct. 24, 2017

(54) PROFILE BAR, PROFILE ASSEMBLY AND METHOD FOR PRODUCING A PROFILE ASSEMBLY

(71) Applicant: Hartmut Flaig, Aldingen (DE)

(72) Inventor: Hartmut Flaig, Aldingen (DE)

( * ) Notice: Subject to any disclaimer, the term of this patent is extended or adjusted under 35 U.S.C. 154(b) by 569 days.

(21) Appl. No.: 14/361,814

(22) PCT Filed: Nov. 30, 2012

(86) PCT No.: PCT/EP2012/074130
§ 371 (c)(1),
(2) Date: May 30, 2014

(87) PCT Pub. No.: WO2013/079681
PCT Pub. Date: Jun. 6, 2013

(65) Prior Publication Data
US 2015/0010343 A1    Jan. 8, 2015

(30) Foreign Application Priority Data
Nov. 30, 2011    (DE) .......................... 10 2011 055 879

(51) Int. Cl.
| | | |
|---|---|---|
| F16B 7/04 | (2006.01) | |
| B23P 19/04 | (2006.01) | |
| F16B 7/18 | (2006.01) | |
| E04B 1/58 | (2006.01) | |
| E04C 3/04 | (2006.01) | |
| E04B 1/38 | (2006.01) | |

(52) U.S. Cl.
CPC ............ F16B 7/0433 (2013.01); B23P 19/04 (2013.01); E04B 1/5831 (2013.01);
(Continued)

(58) Field of Classification Search
CPC ........ F16B 7/187; F16B 7/0433; F16B 7/044; F16B 7/18; F16B 7/22; Y10T 403/39; Y10T 403/3906
See application file for complete search history.

(56) References Cited

U.S. PATENT DOCUMENTS 4,775,259 A * 10/1988 Shell .......................... A47F 5/14
                                                            403/187
5,634,300 A *  6/1997 Huebner ............... E04B 2/7407
                                                             52/281
(Continued)

FOREIGN PATENT DOCUMENTS

DE        9210639 U1   10/1992
DE        4127284 C1 * 12/1992   ............ E04B 2/766
(Continued)

OTHER PUBLICATIONS

Office action for Eurasian Patent Application No. 201491054 dated Oct. 29, 2015.

*Primary Examiner* — Jonathan Masinick
(74) *Attorney, Agent, or Firm* — Bachman & LaPointe, PC

(57) ABSTRACT

A profile bar (10, 10*a*) formed as an extruded part and consisting of a light metal alloy, in particular an aluminum alloy, with a rectangular in particular square, cross-section, wherein a longitudinal groove pair (20, 20*a*), comprising two longitudinal grooves arranged parallel to one another and at a distance from one another, is provided in each case on at least one lateral surface, preferably on all four lateral surfaces, and with at least two, preferably four, longitudinal channels which extend parallel to the longitudinal grooves and which form in each case an opening (40) for fastening in each case a pen (34) on each of the two end faces (36) of the profile bar (10, 10*a*), wherein each longitudinal channel is arranged on an imaginary intersection line of planes extending at a right angle to one another and arranged perpendicularly to in each case a lateral surface, wherein at least one of the planes is a longitudinal center plane of a longitudinal groove of a longitudinal groove pair (20).

17 Claims, 5 Drawing Sheets

(52) U.S. Cl.
CPC . *E04B 2001/405* (2013.01); *E04B 2001/5881* (2013.01); *E04C 2003/0439* (2013.01); *E04C 2003/0465* (2013.01); *E04C 2003/0478* (2013.01); *F16B 7/187* (2013.01); *Y10T 29/49947* (2015.01); *Y10T 403/3906* (2015.01)

(56) References Cited

U.S. PATENT DOCUMENTS

| | | | |
|---|---|---|---|
| 5,921,052 A | 7/1999 | Kemp | |
| 2009/0000235 A1 | 1/2009 | Kieran et al. | |
| 2011/0258812 A1* | 10/2011 | Oetlinger | B31B 3/00 16/382 |
| 2015/0225940 A1* | 8/2015 | Marple | E04B 2/60 52/582.2 |

FOREIGN PATENT DOCUMENTS

| | | | | |
|---|---|---|---|---|
| DE | 29611887 U1 | 9/1996 | | |
| DE | 19638221 A1 | 4/1998 | | |
| DE | 19757089 C1 | 4/1999 | | |
| DE | 29910404 U1 | 8/1999 | | |
| DE | 20201977 U1 | 4/2002 | | |
| DE | EP 1617088 A1 * | 1/2006 | ........... | B25J 9/0009 |
| DE | 202007002604 U1 | 5/2007 | | |
| DE | 202015102805 U1 * | 10/2015 | ........... | E04B 1/5831 |
| EP | 1227251 A1 | 7/2002 | | |
| EP | 1635075 A2 | 3/2006 | | |
| FR | 2330898 A1 * | 6/1977 | ........... | B62D 33/044 |
| IL | WO 2011058559 A2 * | 5/2011 | ................ | F16B 7/18 |

* cited by examiner

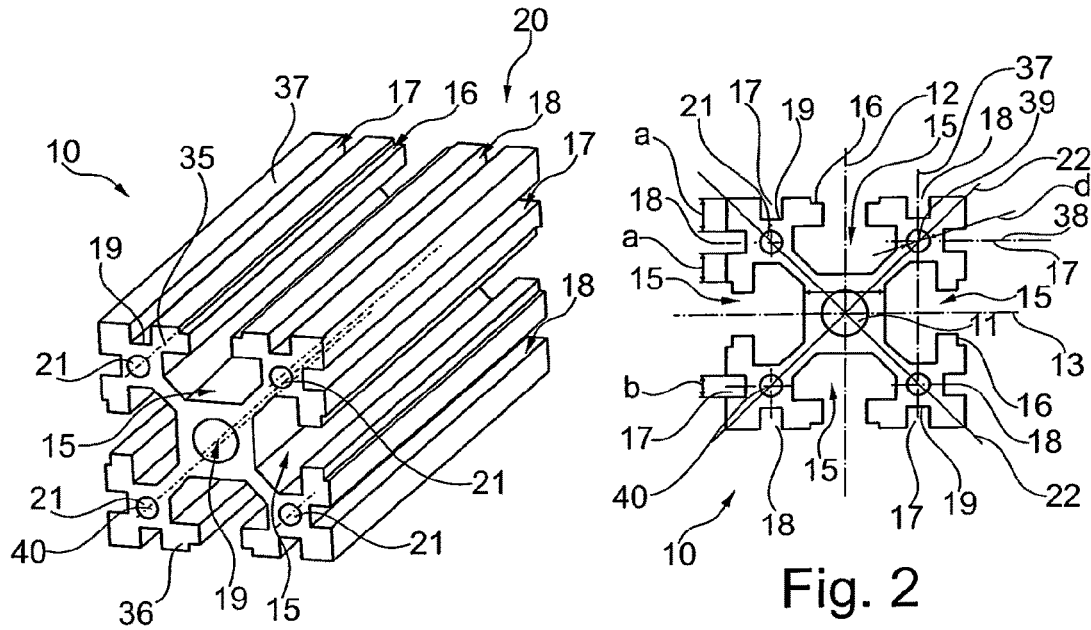
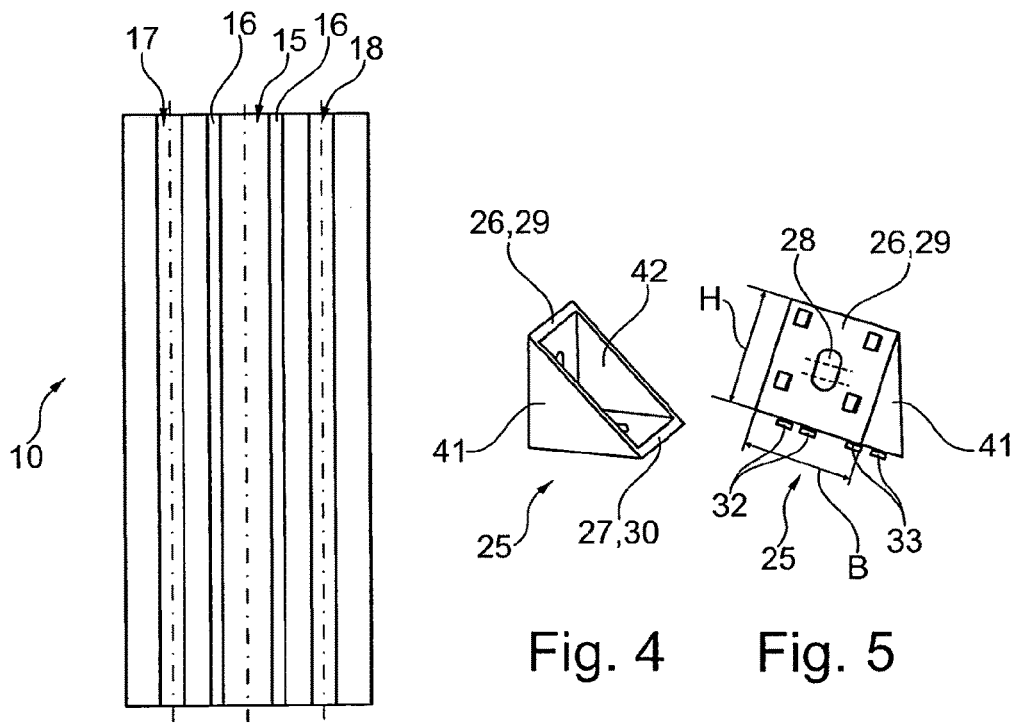
Fig. 1
Fig. 2
Fig. 3
Fig. 4
Fig. 5

PROFILE BAR, PROFILE ASSEMBLY AND METHOD FOR PRODUCING A PROFILE ASSEMBLY

BACKGROUND OF THE INVENTION

The invention relates to a profile bar, a system with at least one such profile bar, and a profile assembly, comprising two profile bars, as well as a method for producing such a profile assembly.

Profile bars, in particular aluminium profile bars are generally known and serve for the production or respectively forming of supporting structures which are a component part, for example, of machinery or suchlike. Here, usually a plurality of profile bars are used, which are connected rigidly with one another to form a frame, wherein the most varied of connecting elements are known for connecting profile bars with one another at right angles, which connecting elements usually brace two adjacent profile bars with respect to one another. For this purpose, the connecting elements as a rule engage into at least one undercut longitudinal groove of a first profile and into a further undercut longitudinal groove of a second profile or alternatively into a longitudinal channel, in particular a central channel of the second profile, with which the connecting element is fastened for example by screwing. The engagement into an undercut longitudinal groove frequently takes place by means of a so-called sliding block.

If a first profile bar is now fastened with an end face, for example by means of a sliding block and a clamping screw cooperating therewith, against a lateral surface of a second profile bar, the problem arises that a tensile force is exerted onto the sliding block via the first profile bar lying with its end face against the lateral surface of the second profile bar on introduction of a force running perpendicularly to the longitudinal axis of the first profile bar. This tensile force, in connection with the relatively small end surface of the first profile bar, brings about the risk of the bending open of the undercut longitudinal groove of the second profile bar, so that the sliding block is no longer held securely. The risk therefore exists that the first profile bar detaches itself from the second profile bar. Furthermore, the problem exists that the first profile bar, on introduction of a torque perpendicularly to its longitudinal axis can be twisted about its longitudinal axis to the second profile bar, which makes difficult a positionally or respectively angularly correct mounting of the profile bars with respect to one another, and in the finished profile assembly requires, if necessary, additional components for security against twisting.

Connecting elements for connecting profile bars with one another are known for example from DE 20 2007 002 604 U1 and DE 299 10 404 U1 The known connecting elements are suitable for connecting profile bars with one another in longitudinal direction or perpendicularly, wherein with the known connecting elements likewise tensile forces are generated via the elements which are arranged in the undercut longitudinal grooves, which tensile forces, as explained above, can expand the longitudinal groove receiving them.

A typical profile bar which is widely used in practice is described in DE 197 5 70 89 C1. This known profile bar is contoured in a square shape and has centrally on each side an undercut longitudinal groove for fastening a further profile bar, as is described extensively in the publication. In the known profile bar, the explained risk of bending open of the undercut longitudinal groove likewise exists.

From U.S. Pat. No. 5,921,052 an alternative profile bar is known, which in addition to each undercut longitudinal groove has two non-undercut auxiliary grooves with a rectangular cross-sectional area, receiving the undercut longitudinal groove between them, which auxiliary grooves serve for fastening further components, in which these engage into the additional grooves in a form-fitting manner.

From DE 92 10 639, furthermore, an alternative profile bar is known, which has longitudinal channels running parallel to a central channel and sitting on the corners of an imaginary square. These additional longitudinal channels serve to be provided in their respective end-face end section with a thread, in order to be able to screw herein connecting elements for the bracing of two profile bars with one another. The aim is to be able to use the central bore as a compressed air duct.

The described profile bars serve, as mentioned, in particular for production for frames in machine construction or other supporting structures. It is also usual to arrange on a corresponding profile bar structure a door element on a vertically running profile bar, in which in the associated undercut longitudinal groove of the profile bar corresponding connecting elements are fastened, via which tensile forces are exerted perpendicularly to the longitudinal extent of the profile bar, which can likewise lead to an expanding of the undercut longitudinal groove, so that in particular in the case of additional external applications of force onto the door element the risk exists that the connecting element is pulled out from the undercut groove of the profile bar.

In the knowledge of the above-mentioned prior art, the problem consists of indicating an improved, alternative profile bar which is suitable for realizing in a simple manner a securing against twisting in a profile assembly.

In addition, the profile bar is preferably to be suitable for being able to receive tensile forces introduced for example via a sliding block or another anchoring element into an undercut longitudinal groove, without the risk of deformation or respectively expanding of the longitudinal groove.

Furthermore, the problem consists of indicating a system by which, with the use of a profile bar according to the invention, a security against twisting is provided and, if applicable, an expanding of an undercut longitudinal groove is reliably prevented. Moreover, the problem consists in indicating a profile assembly which is improved accordingly, and a method for producing such a profile assembly.

SUMMARY OF THE INVENTION

To avoid repetitions, features disclosed with regard to the device are to be deemed as disclosed with regard to the method. Likewise, features disclosed with regard to the method are to be deemed as disclosed with regard to the device.

The central idea of the invention is to provide, in a profile bar, longitudinal channels running parallel to longitudinal grooves, such that on the end face pins projecting over the end face are able to be introduced into openings formed by the longitudinal channels, such that the pins can engage into the longitudinal grooves of an identically constructed further profile bar arranged at right angles to the profile bar, in order to hereby secure the two profile bars against twisting with respect to one another.

For this, at least two pins must be provided in the one profile bar, wherein the pins engage into different longitudinal grooves, running parallel to one another, of a longitudinal groove pair of the further profile bar.

For the case where the longitudinal grooves of the longitudinal groove pair are constructed as undercut longitudinal grooves, the measure described above serves primarily for security against twisting. In an alternative embodiment of the profile bar, in which in addition to the longitudinal groove pair for the pins an undercut longitudinal groove is provided between the longitudinal grooves of the longitudinal groove pair, the above measure serves not only for security against twisting, but also serves to prevent an expanding of the undercut longitudinal groove received between the longitudinal grooves of the longitudinal groove pair, when, for example via a sliding block or other connecting or anchoring element, a tensile force is exerted onto the undercut, which is not only advantageous when two profile bars are arranged at right angles to one another and are under tension with respect to one another, but also brings advantages with regard to a prevention of an expanding of the longitudinal groove for the case when in the undercut longitudinal groove a fastening element for a door, in particular a hinge element, is fastened, wherein the hinge element is fastened via an anchoring element in the undercut longitudinal groove.

Furthermore, the longitudinal grooves of a longitudinal groove pair of a further, primarily right-angled positioning of two profile bars can serve to simplify mounting when two profile bars are fastened to one another with an angle element which engages via corresponding extensions into the longitudinal grooves of the longitudinal groove pairs of the profile bars which are arranged at right angles to one another. At the same time, via such angle elements, for the case of the provision of an undercut longitudinal groove in addition to the longitudinal grooves of a longitudinal groove pair an expansion of the undercut longitudinal groove can be prevented.

In the simplest case, the profile bar has a longitudinal groove pair on only one lateral surface, with two parallel longitudinal grooves to respectively receive a pin received in an end-face opening of a further profile bar. In this case, the longitudinal channels are arranged respectively on an imaginary intersection line of a longitudinal centre plane of a longitudinal groove of the longitudinal groove pair and a further plane, which runs orthogonally to a lateral surface which runs at right angles to the lateral surface which has the longitudinal groove pair. For the preferred case that a longitudinal groove pair is provided respectively on at least two lateral surfaces running at right angles to one another, the longitudinal channels lie on respectively an intersection line of two longitudinal centre planes of two longitudinal grooves, which are situated on lateral surfaces running by 90° to one another. Independently of the practical embodiment, it is preferred if the respective intersection line forms a longitudinal centre axis of the associated longitudinal channel.

In addition to the embodiments described above, according to which two longitudinal grooves are provided on only one lateral surface or respectively two longitudinal grooves are provided on two lateral surfaces running at right angles to one another, an embodiment is also possible in which a longitudinal groove pair are provided respectively on three lateral surfaces to receive pins arranged in the longitudinal channels of a further profile bar. It is also possible and particularly preferred to provide a longitudinal groove pair respectively on all four lateral surfaces, wherein the longitudinal channels are then arranged respectively on intersection lines of two longitudinal centre planes of two longitudinal grooves of different longitudinal groove pairs, which are situated on lateral surfaces offset by 90° to one another.

It is most particularly preferred if the at least two openings, formed from two longitudinal channels, of an end face are arranged diametrically opposite in relation to a longitudinal centre axis of the profile. Preferably, the openings lie on a plane of symmetry of the profile bar, which runs at a 45° angle to two lateral surfaces. For the case of the provision of four openings per end face, wherein each opening is formed by respectively a longitudinal channel, it is preferred if the openings are arranged lying on the corners of an imaginary square. The provision of four openings or respectively four longitudinal channels is particularly preferred for an embodiment of the profile bar in which the profile bar has respectively a longitudinal groove pair, to receive pins arranged in openings of a further profile bar, on at least two lateral surfaces arranged at right angles to one another.

As already indicated in the introduction, different possibilities exist with regard to the configuration of the longitudinal grooves of the longitudinal groove pairs or of the at least one longitudinal groove pair. In particular in the case of larger profile bars, it is preferred if the longitudinal grooves of a longitudinal groove pair are constructed to receive pins as undercut longitudinal grooves, in which typically sliding blocks can be received. In such profile bars, the pins serve primarily for security against twisting.

In an alternative embodiment, in addition to at least one longitudinal groove pair on one lateral surface an undercut longitudinal groove is provided, which runs centrally between the longitudinal grooves of the longitudinal groove pair to receive pins, in order to prevent a bending open of the longitudinal groove on the application of tensile force perpendicularly to the surface extent of the lateral surface, and in order simultaneously to provide a security against twisting for an assembly of two profile bars running at right angles to one another and lying against one another.

In particular for the embodiment of the profile bar with an undercut longitudinal groove received centrally between the longitudinal grooves of a longitudinal groove pair, it is preferred if the longitudinal grooves of the longitudinal groove pair have a rectangular cross-section, or alternatively also are configured as undercut longitudinal grooves, in particular to receive double swallowtail-shaped connectors for connecting with one another two parallel profile bars lying against one another.

An embodiment of the profile bar is particularly expedient, in which the latter has a central channel which is preferably, but not compulsorily, contoured in a circular shape, in particular to receive an anchor screw. If required, the central channel can be provided with an internal thread.

It is particularly expedient if an imaginary connecting line, arranged between two diametrically opposed longitudinal channels, intersects the above-mentioned central channel centrally. The connecting line is preferably a symmetry line which runs to two adjacent lateral surfaces in a 45° angle.

In order to enable a simple mounting and in order to ensure a simple structural installation, it has been found to be particularly preferred if the diameter of the openings formed by the longitudinal channels on the end faces corresponds to a groove width of the longitudinal grooves. Preferably, the diameter corresponds to a minimum groove width for the case where the longitudinal grooves are configured as undercut grooves.

The invention also specifies a system, comprising at least one profile bar constructed according to the concept of the invention, wherein a pin projects from at least two of the openings provided on an end face and formed by respectively a longitudinal channel, which pin protrudes over the end face such that the at least two pins can be received in different longitudinal grooves of a longitudinal groove pair.

Different possibilities exist with regard to the embodiment of the pins or respectively the manner of fastening the pins (extensions).

It is possible to construct the pins as externally threaded pins which can be screwed with an external thread into an internal thread which is then provided in the longitudinal channels, or which pins have a self-cutting thread, in order to produce a corresponding internal thread in the associated longitudinal channel by cutting or by shaping. An embodiment is particularly expedient, in which the pins are constructed as so-called notched- or dowel pins, which are held in a gripping manner in the longitudinal channels, in particular by realizing a press fit. For this, the diameter of the pin corresponds at least approximately to the internal diameter of the associated longitudinal channel. It is particularly expedient if in addition the diameter of the pins corresponds at least approximately to a groove width of the associated longitudinal groove, in particular a minimum longitudinal groove width.

The system preferably also comprises a connecting element for connecting two profile bars according to the invention. It is particularly expedient here if the connecting element has two support sections arranged at right angles to one another, in which preferably respectively a through-opening is provided for a connecting element at least indirectly cooperating with an undercut longitudinal groove of the profile bar, and that on the side of the connecting element facing the respective profile bar at least one extension is constructed, which cooperates with a longitudinal groove of a longitudinal groove pair or respectively projects therein perpendicularly to its longitudinal extent and which aligns the connecting element hereby to the profile bar. Hereby, the connecting element can be positioned particularly simply to the profile bars or respectively can be brought in connection therewith, wherein the profile bars and the connecting element are aligned to one another via the extensions and the longitudinal grooves of longitudinal groove pairs.

A particularly secure and robust positioning of the profile bars by means of the previously outlined connecting element can be achieved if two extensions, spaced apart from one another in longitudinal direction of the longitudinal grooves, are associated with both longitudinal grooves of a longitudinal groove pair of each profile bar.

In a structurally preferred configuration of the connecting element, provision is made that the two support sections are constructed on plate-shaped support elements, and that the support elements are connected at their end faces by means of reinforcing plates arranged perpendicularly to the plane of the support elements. Thereby, the bending moments which are introduced via a first profile bar are transferred particularly well from the connecting element to the second profile bar.

In a most particularly preferred embodiment of the production of the connecting element, it is proposed that the connecting element is constructed as an aluminium pressure die casting or as a cold extruded part.

The invention also specifies a profile assembly, comprising a first and a second profile bar, wherein these profile bars are constructed respectively according to the concept of the invention. The first and the second profile bar are arranged at right angles to one another within the profile assembly, such that the first profile bar rests with an end face on a lateral surface of the second profile bar, wherein a pin, in particular a notched or dowel pin, is fastened in at least end-face two openings of the first profile bar, formed by respectively a longitudinal channel, which pin engages into a longitudinal groove of a longitudinal groove pair of the second profile bar. It is particularly expedient here if in addition a connecting element is provided, by which the two profile bars are under tension with respect to one another. It is still further preferred, if the profile bars are profile bars which in addition to a longitudinal groove pair to receive the connecting element have an undercut longitudinal groove arranged between the longitudinal grooves of the longitudinal groove pair, the expanding of which longitudinal groove is prevented by the engaging of the first profile bar with the end-face pins in longitudinal grooves of the longitudinal groove pair of the second profile bar.

The invention also specifies a method for producing a profile assembly configured by the concept of the invention, wherein for this two profile bars are provided or respectively used which are configured according to the concept of the invention.

The first profile bar is provided on the end face with at least two pins which are introduced into openings which are formed by respectively a longitudinal channel, wherein the two profile bars are aligned to one another so that the pins engage into the longitudinal grooves of a longitudinal groove pair of the second profile bar. Preferably, the two profile bars are additionally under tension with respect to one another via a connecting element, wherein the connecting element, depending on the configuration, engages in particular by means of a sliding block into at least one undercut longitudinal groove of one of the profile bars and/or is fastened into a longitudinal channel of one of the profile bars or into a longitudinal groove in the direction of its longitudinal extent, in particular by screwing. A profile assembly constructed according to the concept of the invention can be mounted particularly simply, and the profile bars can be positioned or respectively aligned with respect to one another particularly simply.

Furthermore, torques or forces introduced via a profile bar are received particularly well by the other profile bar, without the latter being deformed or damaged.

BRIEF DESCRIPTION OF THE DRAWINGS

Further advantages, features and details of the invention will emerge from the following description of preferred example embodiments and with the aid of the drawings.

These show in:

FIG. 1 a profile bar according to concept of the invention,

FIG. 2 a cross-sectional view of the profile bar according to FIG. 1,

FIG. 3 a top view onto the profile bar according to FIG. 1,

FIG. 4 and FIG. 5 respectively a connecting element for connecting two profile bars in different perspective illustrations, FIG. 6 a profile assembly consisting of two profile bars and a connecting element, in side view, wherein of course alternative connecting elements could be provided, in particular those which tension the two profile bars with respect to one another, FIG. 7 a view onto the profile assembly according to FIG. 6 in the direction of the arrow VII of FIG. 6, FIG. 8 a view according to the profile assembly in the direction of the arrow VIII of FIG. 6, FIG. 9 a perspective view of the profile bar according to FIG. 1 with pins projecting on the end face from openings formed by longitudinal channels, FIG. 10 a profile assembly modified with respect to FIG. 7, FIG. 11 a cross-section through profile bars connected with one another at their lateral surfaces, FIG. 12 an end face view of an alternative profile bar, and FIG. 13 a top view onto a lateral surface of a profile bar according to FIG. 12.

DETAILED DESCRIPTION

Figure 6:
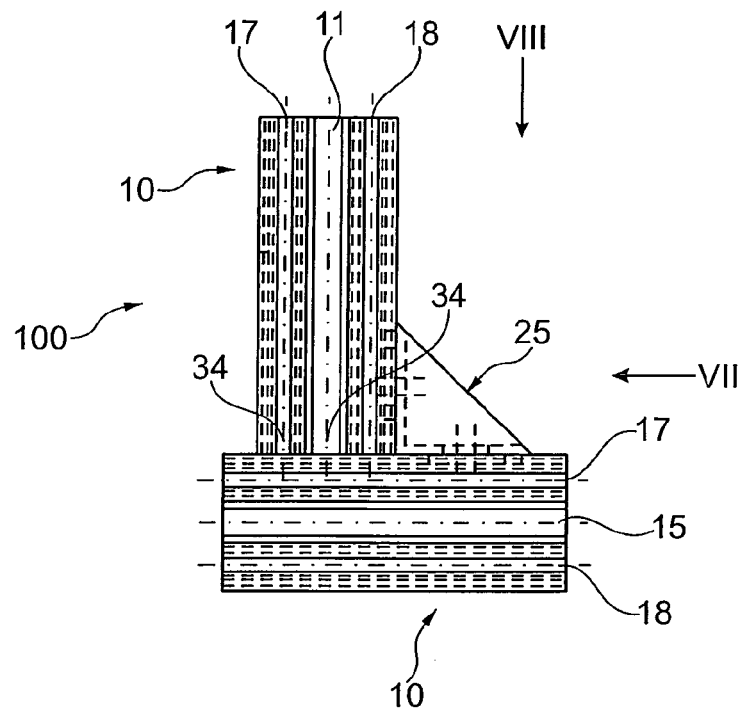

Identical components or respectively components with identical function are provided with identical reference numbers in the figures.

In FIGS. 1 to 3 a profile bar 10 configured according to the invention is illustrated. The profile bar 10 consists at least substantially of aluminium, preferably of AlMgSi1, and is produced by impact extrusion. As can be seen in particular with the aid of FIG. 2, the profile bar 10 has a substantially square cross-sectional shape with four identically constructed lateral surfaces. In a core region of the profile bar 10 a central channel 11 is formed which is continuous in longitudinal direction. The profile bar 10 has two planes of symmetry 12, 13 arranged at right angles to one another, which intersect centrally in the central channel 11. In each of the lateral surfaces of the profile bar 10 a continuous, undercut longitudinal groove 15, running in longitudinal direction of the profile bar 10, is formed centrally to the respective plane of symmetry 12, 13. The undercut longitudinal groove 15 serves, in a manner which is known and is therefore not explained in further detail, to receive for example sliding blocks or suchlike, wherein a threaded bore is formed in the sliding block, which threaded bore cooperates with a fastening screw, which is likewise not illustrated. By means of such a sliding block and the fastening screw, for example add-on pieces can be fastened to a profile bar 10. On the side of the undercut longitudinal groove 15 facing the respective lateral surface of the profile bar 10 in addition a step-shaped shoulder 16 is respectively formed.

Two continuous longitudinal grooves 17, 18 running in longitudinal direction of the profile bar 10 are formed symmetrically to the planes of symmetry 12, 13 in each of the lateral surfaces of the profile bar 10. The longitudinal grooves 17, 18 form together a longitudinal groove pair and, in the first example embodiment, have a respectively rectangular, in particular a square, cross-section. Here, the distance a of the longitudinal grooves 17, 18 of the longitudinal groove pair to the respective lateral surface of the profile bar 10 and to the shoulder 16 of the undercut longitudinal groove 15 is configured for example of equal size.

For example, the profile bar 10 has an edge length of respectively 40 mm. The distance a is 5 mm and the groove width b of the additional longitudinal grooves 17, 18 is respectively 4 mm with a groove depth of 3 mm.

Furthermore, provision is made that spaced apart from the groove base 19 of the respective longitudinal groove 17, 18 of the longitudinal groove pair 20, a longitudinal channel 21, running in longitudinal direction of the profile bar 10, is formed with a diameter d, wherein the diameter d is adapted to the groove width b of the additional longitudinal groove 17, 18. Here, the additional longitudinal channel 21 is aligned to the additional longitudinal grooves 17, 18 such that the additional longitudinal channel 21 runs parallel to the respective longitudinal groove 17, 18, wherein a connecting line 22 arranged between two diametrically opposed longitudinal channels 21 intersects the central channel 11 centrally. As can be seen unequivocally from FIGS. 1 and 2, the—in the example embodiment shown—four longitudinal channels 21 form on the end face respectively an opening 40, wherein the openings 40 in the example embodiment shown are penetrated centrally by the associated intersection line, on which the associated longitudinal channel 21 lies.

Alternative fastening concepts are also able to be realized. As a rule, these have in common the fact that a connecting element coming into use tensions both profile bars with respect to one another. The longitudinal channels 21 are respectively arranged on an intersection line 25 of two planes arranged at right angles to one another, wherein in the shown example embodiment these planes are formed as central planes of two longitudinal grooves of longitudinal groove pairs offset by 90° to one another, so that a pin (not illustrated) received in the longitudinal channels 21 can engage into an associated longitudinal groove of an identical profile bar, when the two profile bars are arranged at right angles to one another, such that the profile bar having the pins rests with its end face 36 on a lateral surface 37 of the other profile bar.

Each of the longitudinal channels 21 lies on an intersection line 35 of two longitudinal centre planes 36, 37, which are drawn in FIG. 2 for clarification. The intersection lines 35 form the respectively longitudinal central axes of the associated longitudinal channels 21. As can be seen from FIG. 2, the longitudinal centre planes 36, 37 intersecting in the intersection line 35 belong to two longitudinal grooves of different longitudinal groove pairs. These longitudinal groove pairs are situated on two lateral surfaces of the profile bar arranged at right angles to one another. Through the arrangement of the longitudinal channels 21 on these intersection lines 35 it is ensured that a pin introduced into an opening 40 formed on the end face by a longitudinal channel 21 can be inserted into a longitudinal groove of an identical profile bar running at right angles. In an alternative example embodiment, which is not illustrated, in which for example a longitudinal groove pair 22 for receiving pins is provided only on one of the lateral surfaces 37, a corresponding intersection line is likewise as formed by two planes arranged perpendicularly to one another, wherein one of the planes is formed by a longitudinal centre plane of a longitudinal groove of the longitudinal groove pair, and the further plane is a plane which stands perpendicularly on a lateral surface, which runs at right angles to the lateral surface which has the longitudinal groove pair.

An embodiment is basically preferred according to which at least two longitudinal channels lie on respectively an intersection line which is formed respectively by two longitudinal centre planes, intersecting one another in the intersection line, of two longitudinal grooves of different longitudinal groove pairs, which are situated on two lateral surfaces arranged at right angles to one another.

In FIGS. 4 and 5 a connecting element 25 is illustrated for use with profile bars 10 according to the invention. In a first embodiment, the connecting element 25 is constructed as an (aluminium) pressure die casting and comprises two support sections 26, 27 arranged at right angles to one another, in which respectively an elongated hole 28 is formed, which is aligned with the undercut groove 15. The width B and height H of the two support sections 26, 27 is preferably likewise respectively 40 mm.

The support sections 26, 27 are constructed in square, plate-shaped support elements 29, 30, which are connected with one another via reinforcing plates 41, 42 which are triangular-shaped in cross-section, which reinforcing plates are arranged on the opposite end faces of the support elements 29, 30. Four extensions 32, 33 are arranged respectively on the undersides of the support elements 29, 30 facing away from the reinforcing plates 41, 42. The extensions 32, 33 are constructed respectively approximately in cuboid shape with a rectangular cross-section, wherein the one extensions 32, spaced apart from one another in longitudinal direction, are associated for example with the one additional longitudinal groove 17, whilst the two other extensions 33, likewise spaced apart in longitudinal direction, are associated with the second additional longitudinal groove 18. The cross-section of the extensions 32, 33 is adapted in particular to the width b of the longitudinal grooves 17, 18 of a longitudinal groove pair 20.

In an alternative embodiment of the production process of the connecting element 25, this can also be constructed as a cold extruded part. Here, the extensions 32, 33 can either be constructed during the forming process or else as additional, pin-shaped components which are pressed for example into correspondingly prefabricated openings of the connecting element in a separate manufacturing step.

Figure 7:
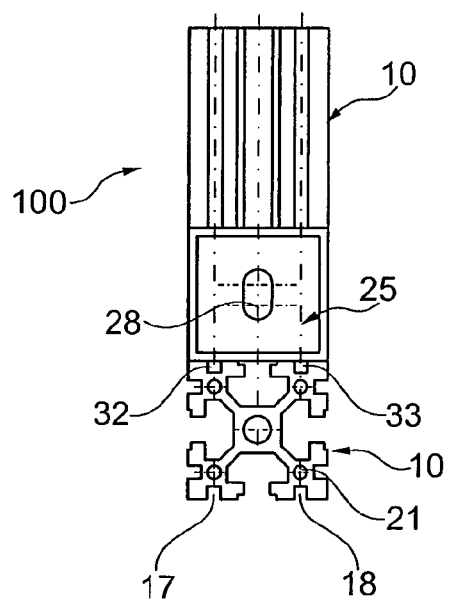
Figure 8:
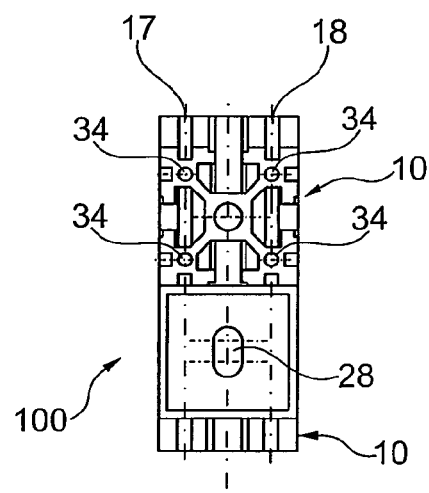

In FIGS. 6 to 8 a profile assembly 100 is illustrated, consisting of at least two profile bars 10 according to the invention and a connecting element 25, connecting the at least two profile bars 10 with one another. Here, the illustration of the connection between the connecting element 25 and the profile bars 10 is made, for simplicity, without the already mentioned anchoring system or respectively the sliding block, and its counter-element, arranged in the central channel 11, which exerts the tensile force which has been mentioned onto the anchoring element or respectively the sliding block, wherein the mentioned parts are necessary in a profile assembly 100 for fixing the components (profile bars 10 and connecting element (25). In particular, however, it is conceivable that provision can be made in accordance with FIG. 8, to insert pins 34 in the longitudinal channels 21 (more precisely in end-face openings 40 formed by these) of the profile bar 10, which lies with its end face on the lateral surface of the other profile bar 10, which pins project over the end face 36 of the profile bar 10 and engage into the longitudinal channels 17, 18 of the longitudinal groove pair 20 of the other profile bar 10. For this, the pins 34 have a diameter which corresponds approximately to the groove width of the longitudinal grooves 17, 18 of the longitudinal groove pair 20. Through the use of the pins 34, the profile bar 10, which rests with its end face on the lateral surface of the other profile bar 10, is prevented from twisting or respectively is positioned and fixed in an angular position to this.

Furthermore, the pins 34, on introduction of a perpendicular to the longitudinal direction of the profile bar 10 carrying the pins 34, stabilize or respectively reinforce the wall regions of the profile bar 10 arranged on both sides of the undercut groove 15, in the additional longitudinal grooves 17, 18 of which profile bar the pins 34 engage. Thereby, these wall regions are prevented from bending open, caused by a tensile force onto the sliding block. Via the profile bar 10 carrying the pins 34, torques introduced therein perpendicularly to its longitudinal axis can also be transferred directly into the other profile bar 10, without the connecting element 25 being stressed for this.

Figure 9:
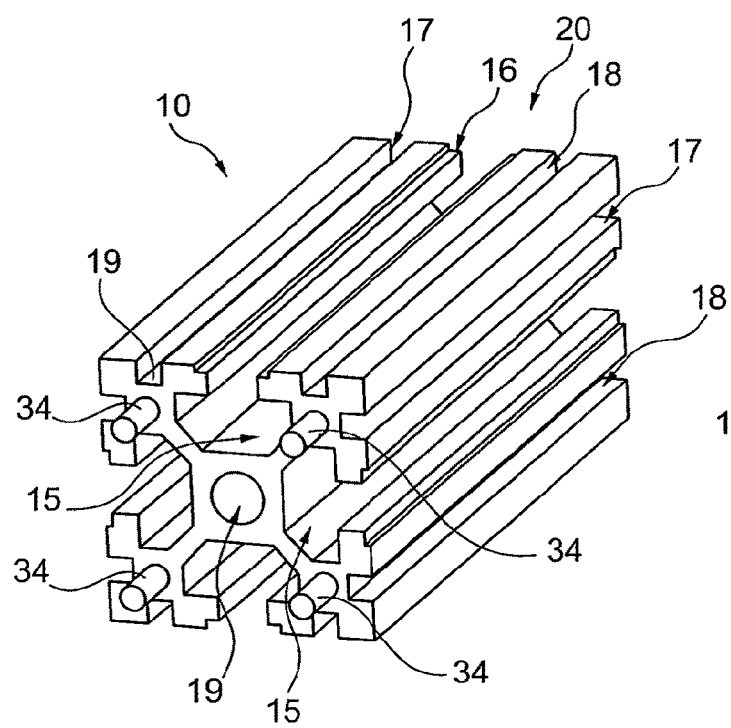

In FIG. 9 the profile bar 10, from the end face of which the pins 34 project, is illustrated again in a single representation. The pins 34 can be notched pins, dowel pins or similar, which are axially fixed in the additional longitudinal channel 21, in particular by a corresponding clamping—or press fit between the additional longitudinal channel 21 and the pin 34. For this, the pins are introduced into the openings formed on the end face by the longitudinal channels.

From FIG. 9 the position of the pins and also that of the longitudinal channels associated therewith relative to the longitudinal grooves 17, 18 of the longitudinal groove pairs 20 becomes particularly clear. In the embodiment shown, in which more than two longitudinal groove pairs 20 (on different lateral surfaces) are provided, it is essential that the longitudinal channels and hence consequently also the pins 34 are situated on intersection lines of longitudinal centre planes of two longitudinal grooves of different longitudinal groove pairs, wherein the longitudinal groove pairs are situated on lateral surfaces offset by 90° to one another.

Figure 10:
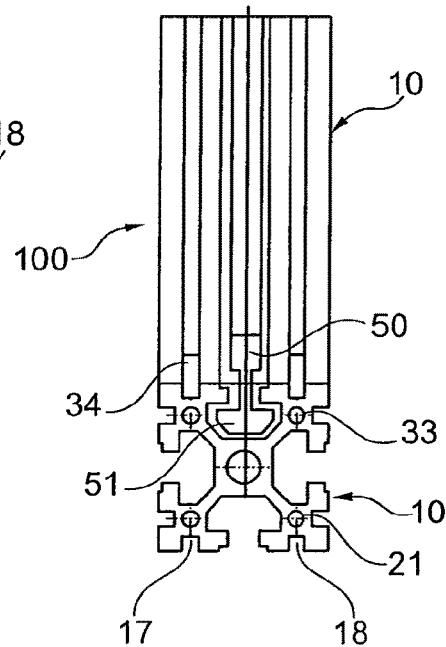

Furthermore, the profile assembly 100, as in FIG. 20 in a modification to the illustration of FIGS. 6 to 8 with the use of the pins 36 can also be constructed without the connecting element 25. Thus in FIG. 10, the two profile bars 10 arranged at right angles to one another can be seen, wherein in the one profile bar 10 in its central channel 11 an anchoring element 50 is situated, which exerts a tensile force, directed in the direction of the anchoring element 50, onto a sliding block 51 anchored in the undercut longitudinal groove 15 of the other profile bar 10.

The production of a profile assembly 100 comprises the fastening of a profile bar 10 or of another element on a lateral surface of the profile bar 10 by means of a sliding block 51 or similar arranged in the central channel 11 of the profile bar 10, and the application of a tensile force onto the sliding block 51 or similar, wherein extensions 43 or similar engage into the additional longitudinal grooves 17, 18 of the profile bar 10 carrying the sliding block 51 or similar, which extensions prevent the central channel 11 from an expansion as a result of the tensile force onto the sliding block 51 or similar.

Figure 11:
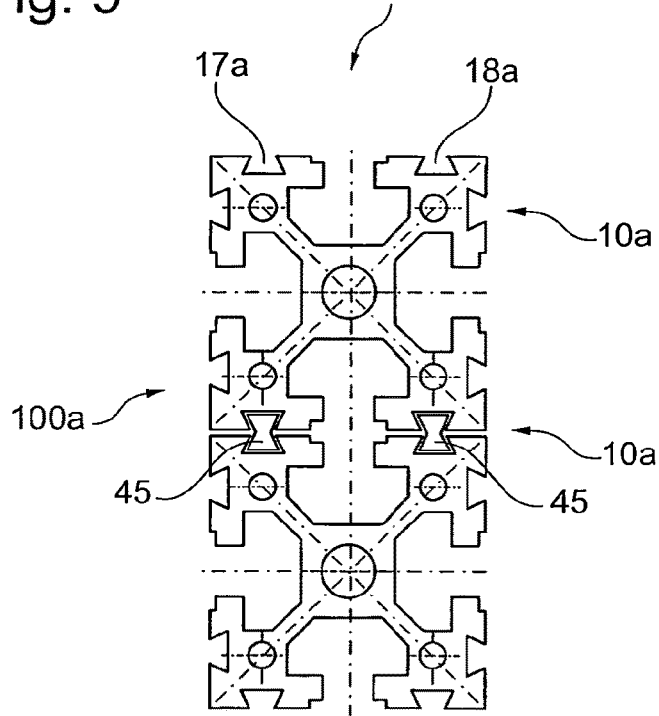

In FIG. 11, modified profile bars 10a are illustrated, which form a profile assembly 100a. The profile bars 10a have longitudinal grooves 17a, 18a forming longitudinal groove pairs 20a, which longitudinal grooves are configured respectively in the form of an undercut groove. Thereby, two profile bars 10a can be connected with one another with the use of at least one double swallowtail-shaped connecting block 45 engaging in a form-fitting manner into opposite longitudinal grooves 17a. In the illustration of FIG. 11, the two facing lateral faces of the profile bars 10a lie against one another. However, embodiments of the connecting block 45 are also conceivable, in which the latter spaces apart the two profile bars 10a parallel to one another in the manner of a spacer.

It is also conceivable that end-face pins of a further profile bar engage into the undercut longitudinal grooves.

The profile bar 10, 10a described so far, and its connecting element 25 and the connecting block 45 can be altered or respectively modified in a variety of ways without departing from the idea of the invention. Thus it is also conceivable, for example, to use the longitudinal channels 21 or respectively the longitudinal grooves 17, 17a, 18, 18a for fastening other (add-on) parts, such as for example a door element or similar. A profile assembly 100 can also be produced using a connecting element 25, wherein the connecting element 25 has no extensions 32, 33.

Figure 12:
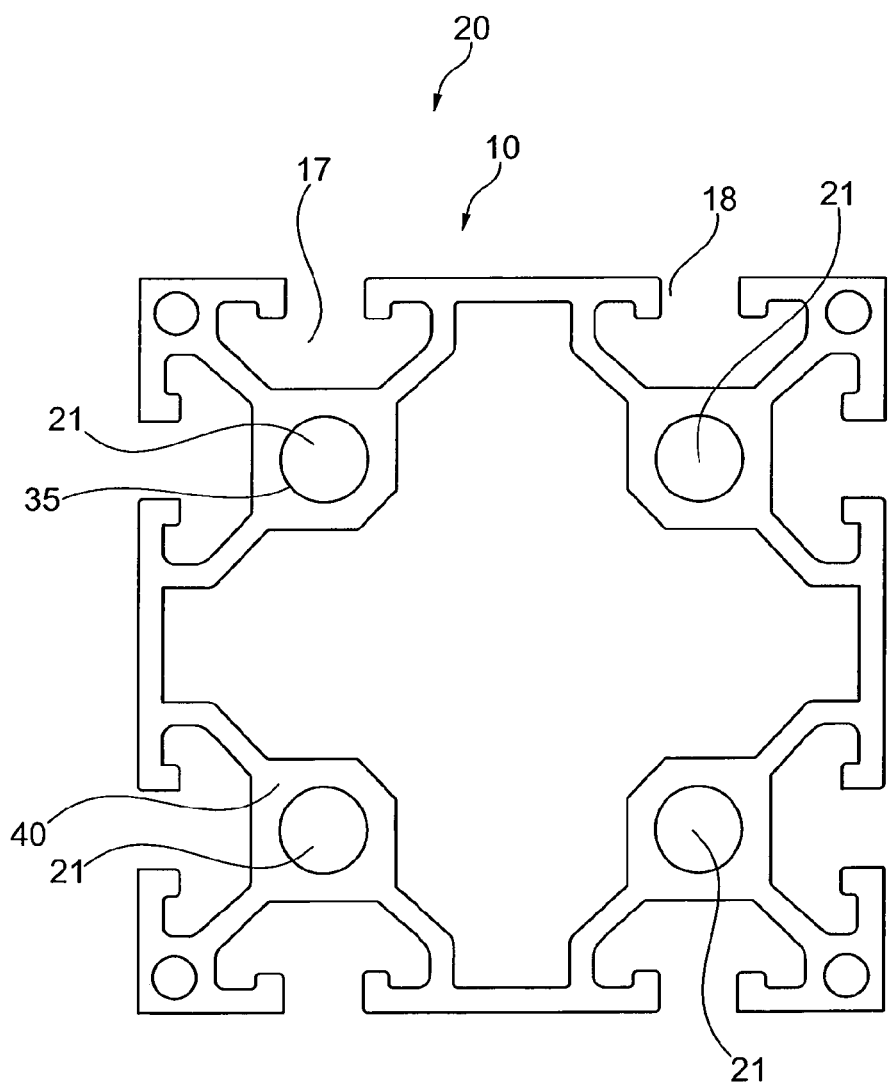
Figure 13:
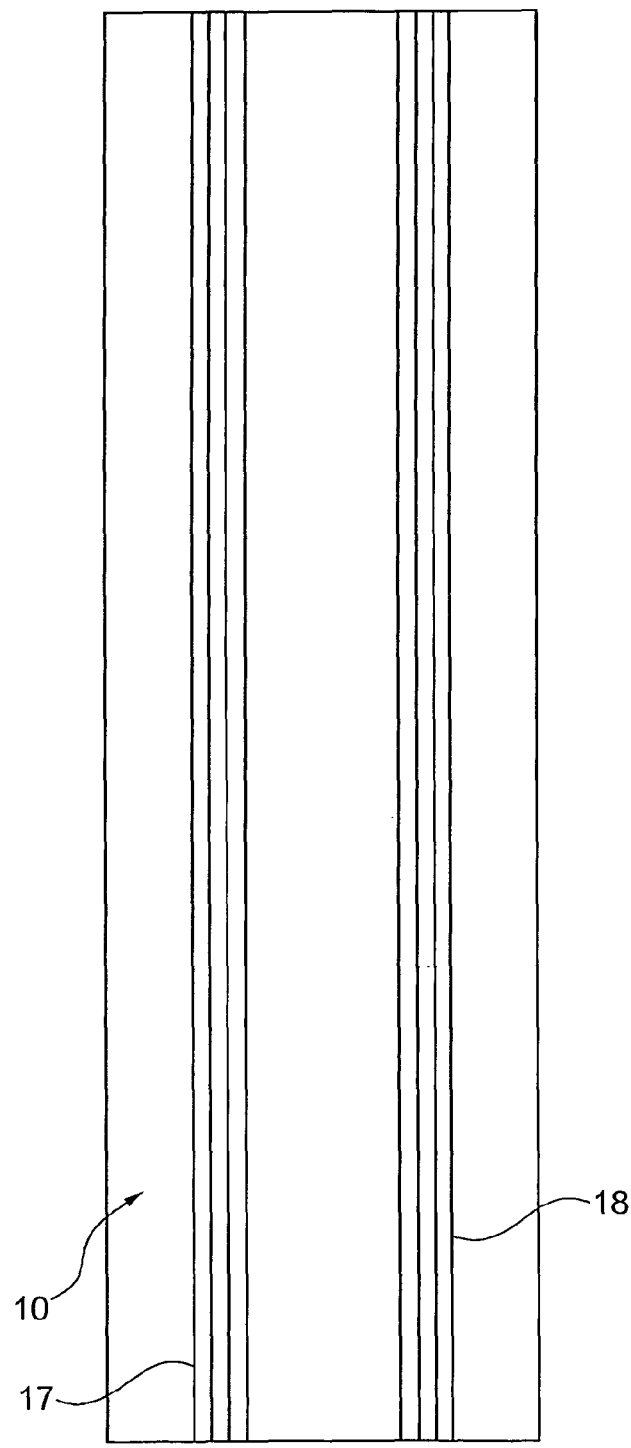

In FIGS. 12 and 13, views are shown, rotated through 90° to one another, of an alternative profile bar 10, in which the two longitudinal grooves 17, 18 of the longitudinal groove pairs 20 are constructed as undercut longitudinal grooves to receive sliding blocks, for example. From the end-face view shown in FIG. 12, it can be seen that longitudinal channels 21 are provided on the end face, which are aligned to the longitudinal grooves 17, 18 of the longitudinal groove pairs 20 such that pins can be inserted into the end-face openings 40 formed by the longitudinal channels 21, in an analogous manner to the example embodiment according to FIG. 9, which pins can then engage in longitudinal groves of an identically contoured profile bar which is arranged at a 90° angle to the profile bar which is shown. For this, the longitudinal channels 21 are situated respectively on an intersection line 35 of two longitudinal grooves of longitudinal groove pairs offset by 90° to one another. As in the example embodiment according to FIG. 9, the intersection lines 35 form the longitudinal central axes of the associated longitudinal channels 21.

In the example embodiment according to FIGS. 12 and 13, the pins, which for reasons of clarity are not drawn, which are held in the longitudinal channels 21 by screwing or preferably by a press fit, serve substantially as a security against twisting of two profile bars put together to form a profile assembly.

The invention claimed is:

1. A profile bar (10, 10a) constructed as an impact extrusion part from an aluminium alloy with a rectangular cross-section having lateral surfaces (37), wherein on at least one lateral surface a longitudinal groove pair (20, 20a) comprising two longitudinal grooves arranged parallel to one another and spaced apart from one another is provided, wherein an undercut longitudinal groove (15) to receive sliding blocks (51) is provided centrally along the lateral surface (37) provided with the longitudinal groove pair (20, 20a), wherein the undercut longitudinal groove (15) is between the longitudinal grooves (20, 20a) of the longitudinal groove pair (20, 20a) provided on the lateral surface, and at least two longitudinal channels running parallel to the longitudinal grooves, wherein the longitudinal channels form on each of two end faces (36) of the profile bar (10, 10a) an opening (40) for fastening a pin (34), wherein each longitudinal channel is arranged on an imaginary intersection line of planes running at right angles to one another and arranged perpendicularly to respective surfaces of the lateral surfaces, wherein at least one of the planes is a longitudinal center plane of one of the longitudinal grooves of the at least one longitudinal groove pair (20), and wherein the imaginary intersection line of planes forms a longitudinal center axis of the associated longitudinal channel.

2. The profile bar according to claim 1, wherein the planes forming the intersection lines are longitudinal centre planes of two longitudinal grooves of different longitudinal groove pairs (20, 20a) arranged on two lateral surfaces of the extrusion part which are oriented at right angles to one another.

3. The profile bar according to claim 1, wherein on the two end faces (36) two of the openings (40) are arranged lying opposite diametrically in relation to a longitudinal central axis of the profile.

4. The profile bar according to claim 1, wherein the longitudinal grooves of each longitudinal groove pair (20, 20a) have a rectangular cross-sectional area.

5. The profile bar according to claim 4, wherein the longitudinal grooves (17, 18) of each longitudinal groove pair (20, 20a) are configured as undercut grooves to receive connectors for connecting two parallel profile bars (10, 10a).

6. The profile bar according to claim 1, wherein the profile bar (10, 10a) has a central channel (11) to receive an anchor screw.

7. The profile bar according to claim 6, wherein an imaginary connecting line (22), arranged between two diametrically opposed longitudinal channels (21), intersects the central channel (11) centrally.

8. The profile bar according to claim 1, wherein a diameter (d) of the openings (40) corresponds to a groove width of the longitudinal grooves (17, 18) of the longitudinal groove pair.

9. A system, comprising at least one profile bar according to claim 1, wherein at least two pins (34) arranged in respectively one of the openings (40) formed by the longitudinal channels project from the end face of the profile bar (10, 10a).

10. The system according to claim 9, wherein the pins (34) are held in the longitudinal channels by one of clamping and press fit.

11. The system according to claim 9, wherein a diameter (d) of the pins corresponds to a groove width of the longitudinal grooves.

12. The system according to claim 11, wherein a connecting element (25) is provided for connecting with one another two profile bars comprising two support sections (26, 27) arranged at right angles to one another, wherein on the side of each support section (26, 27) facing the respective profile bar (10) at least one extension (32, 33) is formed, which cooperates with one of the longitudinal grooves and aligns the connecting element (25) to the profile bar (10, 10a).

13. The system according to claim 12, wherein, in the support sections respectively, a through-opening (28) is constructed for a fastening element cooperating at least indirectly with an undercut longitudinal groove (15).

14. A profile assembly (100, 100a) comprising at least a first and a second profile bar, respectively, according to claim 1, wherein the first and the second profile bar arranged at right angles to one another, such that the end face (36) of the first profile bar rests on the lateral surface (37) of the second profile bar and engages with at least two pins (34), arranged respectively in the opening (40) formed by respectively the longitudinal channel (21) of the first profile bar, into both longitudinal grooves (17, 18) of a longitudinal groove pair (20) of the second profile bar and thereby secures the profile bars against twisting.

15. The profile assembly according to claim 14, wherein the profile bars are fixed to one another via a connecting element comprising an anchoring element engaging into the undercut longitudinal groove of one of the profile bars and/or into a central channel of one of the profile bars.

16. A method for producing a profile assembly (100, 100a) according to claim 15, wherein the first profile bar is arranged with at least two pins provided on the end face such that the pins engage in two longitudinal grooves of a longitudinal groove pair (20, 20a) of the second profile bar.

17. The method according to claim 16, wherein the connecting element engages into the undercut longitudinal groove and/or a central channel (11) at least of one of the profile bars, wherein the profile bars are braced with respect to one another by means of the connecting element (25).

* * * * *